(12) United States Patent
Taniuchi (10) Patent No.: US 10,850,325 B2
(45) Date of Patent: Dec. 1, 2020

(54) METHOD AND APPARATUS FOR MANUFACTURING THREE-DIMENSIONAL OBJECT

(71) Applicant: CANON KABUSHIKI KAISHA, Tokyo (JP)

(72) Inventor: Hiroshi Taniuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 309 days.

(21) Appl. No.: 15/328,143

(22) PCT Filed: Jul. 17, 2015

(86) PCT No.: PCT/JP2015/003626
§ 371 (c)(1),
(2) Date: Jan. 23, 2017

(87) PCT Pub. No.: WO2016/013198
PCT Pub. Date: Jan. 28, 2016

(65) Prior Publication Data
US 2017/0217105 A1    Aug. 3, 2017

(30) Foreign Application Priority Data

Jul. 23, 2014 (JP) .................................. 2014-149483

(51) Int. Cl.
*B29C 64/165* (2017.01)
*B29C 64/40* (2017.01)
(Continued)

(52) U.S. Cl.
CPC .............. *B22F 3/003* (2013.01); *B22F 3/008* (2013.01); *B29C 64/112* (2017.08);
(Continued)

(58) Field of Classification Search
CPC ...... B33Y 10/00; B33Y 30/00; G03G 15/224; G03G 15/225; B29C 64/40; B29C 64/165;
(Continued)

(56) References Cited

U.S. PATENT DOCUMENTS

| 5,362,427 A * | 11/1994 | Mitchell, Jr. ............. | B22F 3/10 264/497 |
| 6,169,605 B1 * | 1/2001 | Penn ..................... | B29C 64/112 358/1.1 |
| 2005/0025905 A1 * | 2/2005 | Pan ........................ | B33Y 10/00 427/558 |
| 2009/0304952 A1 * | 12/2009 | Kritchman ............. | B33Y 10/00 427/595 |

(Continued)

FOREIGN PATENT DOCUMENTS

| EP | 2583774 A2 | 4/2013 |
| JP | H05-192767 A | 8/1993 |

(Continued)

*Primary Examiner* — Peter L Vajda
*Assistant Examiner* — Caroline Montiel
(74) *Attorney, Agent, or Firm* — Canon U.S.A., Inc. IP Division (57) ABSTRACT

Building is performed with a relatively small amount of material. Provided is a method for manufacturing a three-dimensional object. This method includes the steps of stacking a plurality of layers for forming an object; building a wall surrounding the object being formed; and supplying a material between the wall and the object being formed as a support material for supporting the object being formed.

10 Claims, 9 Drawing Sheets

(51) Int. Cl.
  *B29C 64/153* (2017.01)
  *B33Y 10/00* (2015.01)
  *B22F 3/00* (2006.01)
  *B33Y 30/00* (2015.01)
  *B29C 64/112* (2017.01)
  *G03G 15/22* (2006.01)

(52) U.S. Cl.
  CPC .......... *B29C 64/153* (2017.08); *B29C 64/165* (2017.08); *B29C 64/40* (2017.08); *B33Y 10/00* (2014.12); *B33Y 30/00* (2014.12); *G03G 15/224* (2013.01); *G03G 15/225* (2013.01)

(58) Field of Classification Search
  CPC ..... B29C 64/112; B29C 64/153; B22F 3/008; B22F 3/003
  USPC ........................................................ 264/401
  See application file for complete search history.

(56) References Cited

U.S. PATENT DOCUMENTS

| | | | |
|---|---|---|---|
| 2011/0285052 A1* | 11/2011 | Wigand | B33Y 30/00 264/219 |
| 2014/0175708 A1 | 6/2014 | Echigo | |

FOREIGN PATENT DOCUMENTS

| | | | | |
|---|---|---|---|---|
| JP | 10-207194 A | 8/1998 | | |
| JP | 3060179 B2 | 7/2000 | | |
| JP | 2000-280354 A | 10/2000 | | |
| JP | 2002-347129 A | 12/2002 | | |
| JP | 2003159754 A | * 6/2003 | ........... | G03G 15/224 |
| JP | 2006-272917 A | 10/2006 | | |
| JP | 2015-66714 A | 4/2015 | | |
| JP | 2015-134500 A | 7/2015 | | |
| KR | 10-0246263 B1 | 3/2000 | | |

* cited by examiner

METHOD AND APPARATUS FOR MANUFACTURING THREE-DIMENSIONAL OBJECT

TECHNICAL FIELD

The present invention relates to methods and apparatuses for manufacturing three-dimensional objects.

BACKGROUND ART

Additive manufacturing has recently received attention as a method for building three-dimensional objects. Additive manufacturing, which requires no molds and can produce three-dimensional objects having shapes that cannot be built by subtractive manufacturing, is rapidly becoming widespread in applications such as prototyping of mechanical parts.

One limitation to the process of manufacturing three-dimensional objects by additive manufacturing is that it requires supports. In additive manufacturing, in which layers are stacked on top of each other, an object including portions that are isolated during the stacking of layers, like drooping branches of a tree, cannot be manufactured simply by stacking the layers alone. To form isolated portions in additive manufacturing, supports must be formed under the positions where the isolated portions are to be stacked before the stacking of the isolated portions, and the supports must be removed in any manner upon completion of building. Thus, the "stacking" in conventional additive manufacturing refers to the stacking of layers including a pattern for forming the object and a support for supporting the object, depending on the shape of the object to be manufactured.

There are several examples of methods for forming supports in conventional additive manufacturing. Stereolithography, as disclosed in PTL 1, is the process of manufacturing a three-dimensional object by repeating the following layer-forming operation: forming a photosensitive resin layer and then patterning the photosensitive resin layer into the cross-sectional shape of the three-dimensional object to be manufactured by exposing the photosensitive resin layer to light to cure part of the photo-sensitive resin layer. Similar processes include powder sintering, in which a powder of a thermoplastic resin, rather than a photosensitive resin, is partially fused with a laser, and powder binding, in which an adhesive is partially applied to a solid powder. These processes have been employed in commercially available additive manufacturing apparatuses. These processes are similar in that a material is applied to the entire surface and is then partially solidified.

These processes use uncured material to support cured portions. In stereolithography, however, columns are deliberately cured as reinforcements since the uncured material is liquid and thus has insufficient strength.

This approach is advantageous in that it allows the reuse of the material used as the support and eliminates the need for positioning of the support. One disadvantage of this approach, however, is that it requires a vat completely filled with the material to perform building.

Another approach is to apply a material only where needed, which has also been employed in commercially available additive manufacturing apparatuses. According to this approach, including inkjet resin deposition, as disclosed in PTL2, and molten resin deposition, a building material is partially supplied to the object being formed. This approach allows building with a relatively small amount of material since the material is supplied only where needed. Many processes based on this approach allow different materials to be used to form the desired three-dimensional object (model material) and to support the object (support material). This facilitates removal of the support material.

CITATION LIST

Patent Literature

PTL 1: Japanese Patent No. 03060179
PTL 2: Japanese Patent Laid-Open No. 2000-280354

Unfortunately, the support material is not suitable for reuse since it is cured together with the model material, and the object and the support material must be precisely positioned. The removal of the support upon completion of building is also laborious.

SUMMARY OF INVENTION

In view of the foregoing, the present invention provides a method and apparatus for manufacturing a three-dimensional object with a reduced amount of material and without the need for precise positioning of an object and a support during the formation of the support.

An aspect of the present invention provides a method for manufacturing a three-dimensional object. This method includes the steps of stacking a plurality of layers for forming an object; building a wall surrounding the object being formed at a distance from the object being formed; and supplying a fluid material between the wall and the object being formed as a support material for supporting the object.

Further features of the present invention will become apparent from the following description of exemplary embodiments with reference to the attached drawings.

DESCRIPTION OF EMBODIMENTS

Embodiments of the present invention will now be described with reference to the drawings.

First Embodiment

Figure 1:
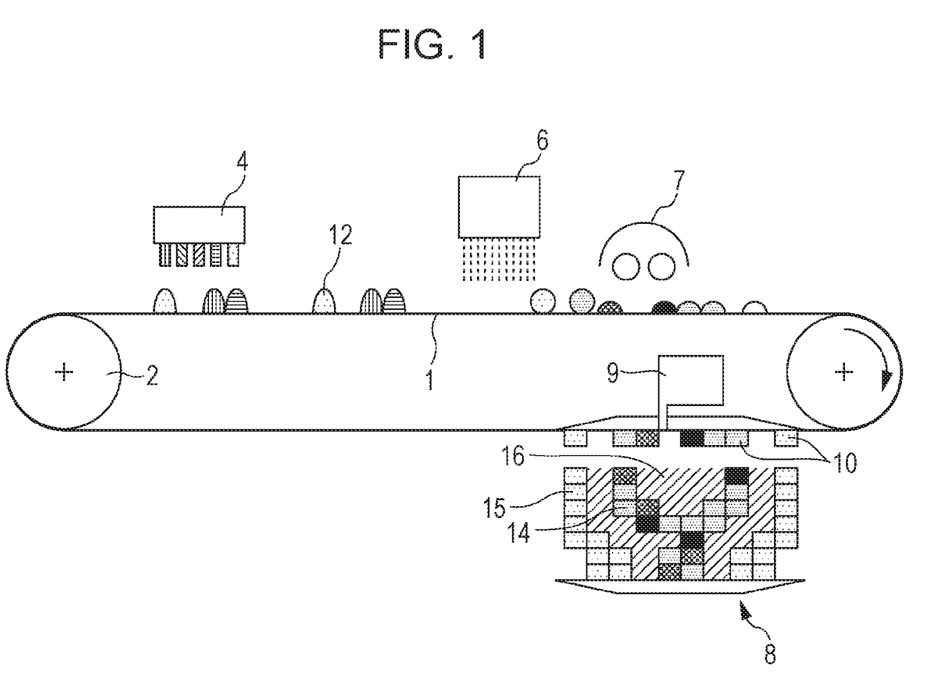
FIG. 1 is a schematic view showing an example additive manufacturing apparatus according to a first embodiment of the present invention.

FIG. 1 is a schematic view showing an example additive manufacturing apparatus configured to implement a method for manufacturing a three-dimensional object according to a first embodiment of the present invention. This apparatus executes patterning to form a layer including a portion for forming a three-dimensional object on a belt-shaped intermediate transfer member 1. As a transport roller 2 serving as a transport mechanism rotates the belt-shaped intermediate transfer member 1, the layer formed thereon passes through each process unit (described later). The layer is then transported to a stacking unit 8 and is stacked on the object being formed.

After the layer including the cross-section of the three-dimensional object is formed on the intermediate transfer member 1 in the apparatus shown in FIG. 1, the layer is transferred from the intermediate transfer member 1 to the object being formed. The intermediate transfer member 1 may be made of a material with good release properties for the building material for forming the layer. If the intermediate transfer member 1 has no release properties, the building material may be incompletely transferred, for example, as occurs in offset printing. Although an object can be formed even in this case, it is desirable to completely transfer the layer from the intermediate transfer member 1 for precise building.

The intermediate transfer member 1 may be elastic enough to allow stable transfer. Examples of materials for the intermediate transfer member 1 include silicone rubber and fluorocarbon rubber. These materials, however, may repel the building material for forming patterns, depending on the physical properties of the building material; therefore, the intermediate transfer member 1 may be surface-treated if necessary. The rubber hardness depends on the thickness of the elastomer. A hard rubber may be used if the intermediate transfer member 1 is thick, whereas a soft rubber may be used if the intermediate transfer member 1 is thin. For example, a hard rubber having a rubber hardness of about 80° may be used if the intermediate transfer member 1 is thick. If intermediate transfer member 1 is a thin belt-shaped member, as shown, a relatively soft rubber having a rubber hardness of about 50° to 20° may be used in the form of a thin film having a thickness of about 0.1 to 0.5 mm.

To achieve high precision, inelastic sheets may be used, including Teflon (registered trademark) sheets and smooth films coated with a release agent at a submicron thickness. A suitable sheet may be selected depending on the precision and time required for building with the additive manufacturing apparatus.

If the building material is, for example, a metal powder, the surface of the intermediate transfer member 1 may be subjected to release treatment with heat-resistant materials such as boron nitride.

The process of forming layers including a portion for forming an object through the operation of the process units will now be described.

The process begins when inks are ejected from an inkjet unit 4 onto the surface of the intermediate transfer member 1 on which an image is to be formed to form an ink pattern 12 corresponding to the shape of the desired three-dimensional object. The inks used herein are water-based pigment inks, which are advantageous in that the colorant is substantially the only solid present therein. Although any ink may be used, the inks should be selected depending on the purpose. The use of inks with high solid contents may result in a large thickness variation relative to the difference in the amount of ink applied and a high impurity content relative to the amount of model material and may thus decrease the strength of the resulting object.

In addition to the pattern corresponding to the shape of the desired three-dimensional object, the ink pattern 12 includes a portion surrounding the object at a predetermined distance. This portion serves as a wall when a support material, described later, is supplied, The cross-sectional shape of the wall perpendicular to the height of the three-dimensional object may be identical at any position along the height. Alternatively, the shape of the wall corresponding to each layer may vary depending on the shape of each layer of the desired three-dimensional object. Although any ink may be used for the portion of the ink pattern 12 corresponding to the wall, a less frequently used ink may be used therefor. For example, if the inkjet unit 4 ejects a plurality of color inks, i.e., cyan, magenta, yellow, and black, a CPU 101, described later, is used to detect the amount of ink consumed or the remaining ink level for each color ink. An ink with a higher remaining ink level may be used in a higher proportion to form the wall. If color inks are used in combination with a reactant that reacts with the inks or a transparent ink, the reactant or the transparent ink may be used for the portion corresponding to the wall. A certain portion of the wall may be weaker than the surrounding portion so that the weaker portion can be broken when a completed object is removed. A wall including a portion that differs in strength from the surrounding portion may be deliberately formed to facilitate removal of a completed object. For example, a wall having a lower strength in the region other than a region around a weak portion of the object may be formed to effectively avoid damage to the object during removal. The strength of the wall can be controlled by changing the thickness of the wall or the type of ink used for forming the wall. A difference in strength can be readily achieved by varying the proportion of inks since inks of different colors have different pigment concentrations.

Figure 4:
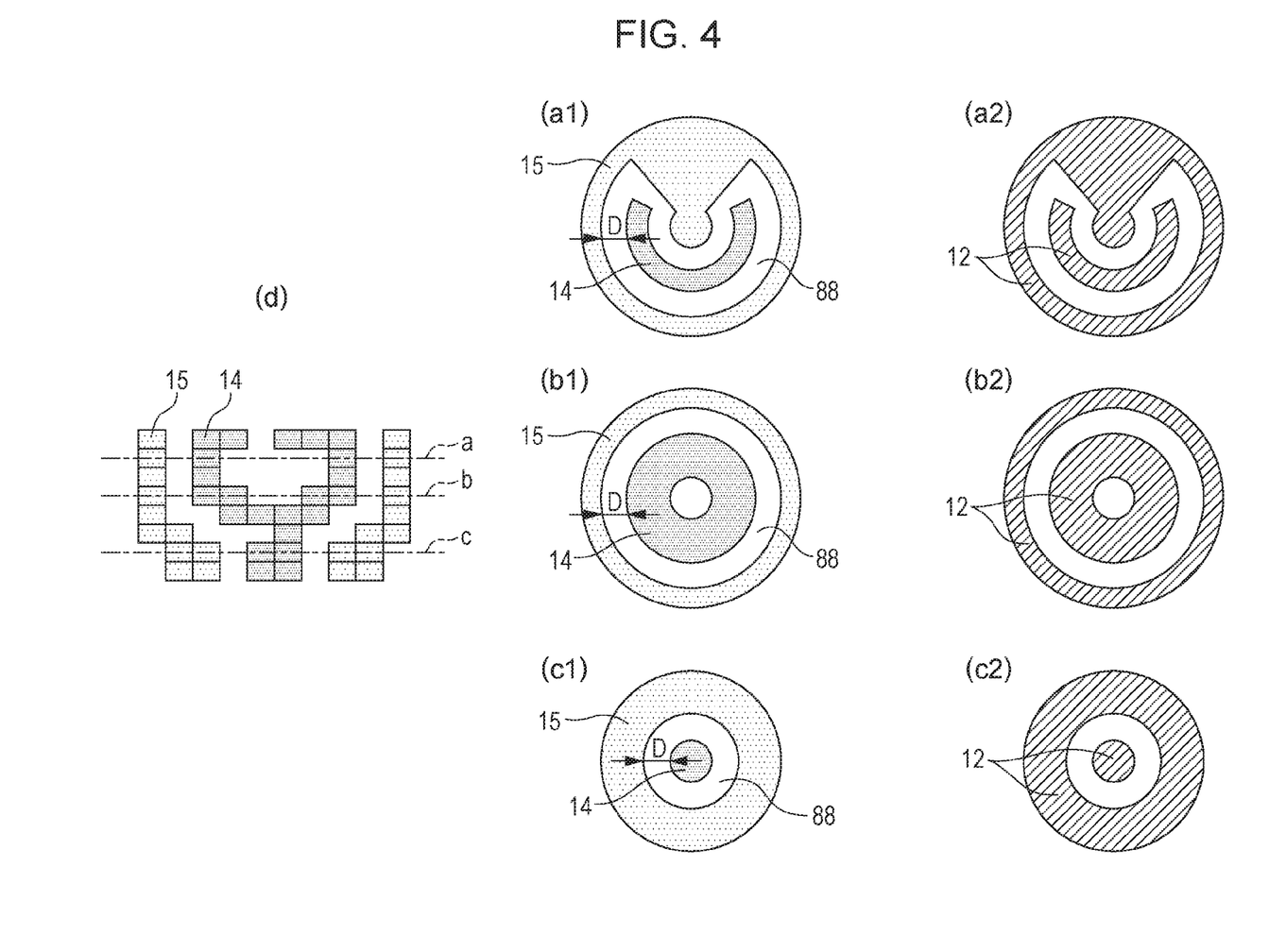
FIG. 4 is a set of sectional views showing the shapes of an object and a wall in the first embodiment of the present invention.

FIG. 4 is a set of sectional views showing the geometrical relationship between the object being formed and the wall. As shown in part (d) of FIG. 4, a wall 15 surrounds an object 14 being formed. Parts (a1), (b1), and (c1) show cross-sections of the object 14 and the wall 15 perpendicular to the height at the positions a, b, and c, respectively, of the layers forming the object 14 and the wall 15. Part (a1) corresponds to the position a. Part (b1) corresponds to the position b. Part (c1) corresponds to the position c. At the position c, as shown in part (c1), the object 14 is narrow in the cross-sectional direction, and accordingly, the wall 15 is provided within a relatively narrow area. At the position b, as shown in part (b1), the object 14 is wider than at the position c, and accordingly, the wall 15 is provided within a wider area than at the position c. At the position a, as shown in part (a1), the object 14 is C-shaped in cross-section, and the inner portion of the wall 15 is shaped to follow the shape of the object 14. As shown in parts (a1) to (c1) and (d) of FIG. 4, a space 88 is defined such that the distance D between the outer surface of the object 14 and the inner surface of the wall 15 is constant at the positions a to c. To form an ink pattern of each layer, an ink pattern including an object pattern and a wall pattern is formed on the intermediate transfer member 1. Parts (a2), (b2), and (c2) of FIG. 4 are schematic views of the top surfaces of ink patterns 12 corresponding to parts (a1), (b1), and (c1), respectively. in this way, a constant distance can be provided between the object 14 being formed and the wall 15. This stabilizes the flow of a support material 16 injected into the space 88. The injected support material 16, which has a constant thickness (in a cross-section perpendicular to the height of the object 14), stably holds the object 14 being formed.

Although the apparatus in FIG. 1 is configured to form a layer on the intermediate transfer member 1 by applying a powdered model material, described later, to a liquid pattern formed by the inkjet unit 4, other configurations are possible. Any other process may be used, provided that a material (in this example, an ink) that allows the powdered model material to adhere to the intermediate transfer member 1 can be applied in any pattern. Other effective processes include digital recording processes such as electrophotography and dispensing and plate-based patterning processes such as offset printing and screen printing. For electrophotography, dry toners are heated to induce adhesion. If an intermediate transfer member with good release properties is used, inkjet printing may be selected, which allows patterns of different colors to be simultaneously formed without contact with the intermediate transfer member.

A powdered-model-material applying unit 6 then applies a powdered model material for forming an object to the ink pattern 12. The powdered model material, which is a particulate material, may have a particle size smaller than the necessary resolution. The powdered model material may be any material that can be treated in any manner to form a film. For example, powdered thermoplastic resins that can be heated to form a film may be used. Glass beads and powdered metals can also be used if the ink pattern contains a film-forming adhesive. In particular, the use of thermoplastic resins provides a lightweight, tough object. It should be understood that a three-dimensional object can also be formed without separately applying a powder, i.e., only with the solid present in the ink. The building material may he selected depending on the purpose of the three-dimensional object to be formed (e.g., strength and color).

The powdered model material may be subjected to surface treatment or coating to improve its properties such as fluidity and color. For example, the powdered model material may be subjected to hydrophilic treatment with radiation or to antistatic coating.

The powdered-model-material applying unit 6 in the apparatus in FIG. 1 directs a flow of air carrying the powdered model material toward the ink pattern 12 to deposit the powdered model material only on the ink pattern 12.

Alternatively, the particulate material may be applied to the entire ink pattern 12, followed by the removal of the particulate material deposited outside the ink pattern 12. The particulate material that is not in contact with the ink pattern 12 has low adhesion to the intermediate transfer member 1 and can thus be separated and removed by wind pressure or vibrations. An electrostatic eliminator may be used if the particulate material is a powdered resin, which is readily electrostatically charged.

Although the apparatus in FIG. 1 is configured to form the ink pattern 12 before applying the powdered model material thereto, other configurations are possible if the ink-pattern forming unit employs noncontact recording such as inkjet printing. For example, the powdered model material may be uniformly applied to the intermediate transfer member 1 before the inks are applied thereto. Thus, the binder material (in this example, the inks) and the structural material (in this example, the powdered model material) may be applied in any manner, provided that both are present in the building pattern on the intermediate transfer member 1.

The powdered model material is deposited not only on the ink pattern corresponding to the shape of the desired three-dimensional object 14, but also on the surrounding ink pattern.

A heating unit 7 then heats the ink on which the powdered model material has been deposited on the intermediate transfer member 1 to melt the powdered model material into a film, thus forming a layer 10. The resulting layer 10 includes a portion serving as the wall for the support material to be supplied later.

Figure 7A:
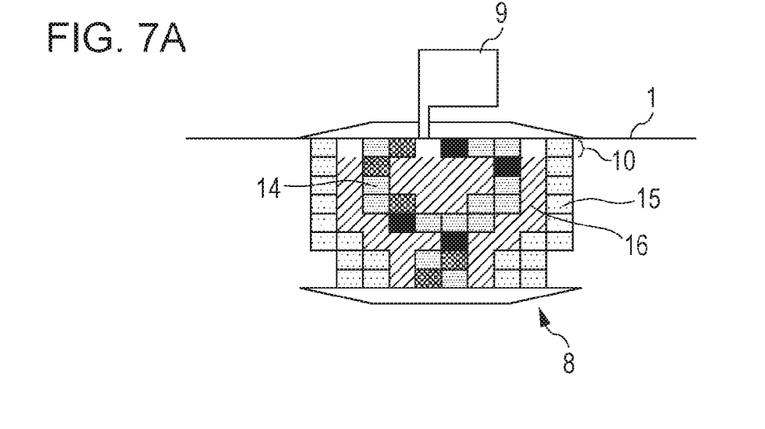
FIG. 7A is a schematic view showing part of an additive manufacturing process according to the first embodiment of the present invention.

A stacking unit 8 then stacks the layer 10 on the object 14 being formed. The apparatus in FIG. 1 positions the layer 10 over the stacking unit 8 while the layer 10 remains molten, lifts the stacking unit 8 to bring the layer 10 into contact with the object 14 being formed, and cools the layer 10 to bond the layer 10 to the object 14 being formed. It should be understood that the layer 10 may be solidified by cooling before the layer 10 is bonded to the object 14 being formed, for example, using an adhesive. Alternatively, the layer 10 may be stacked by moving (in this example, lowering) the intermediate transfer member 1, with the stacking unit 8 being fixed. The stacking unit 8 and its vicinity in this step are illustrated in FIG. 7A.

In this state, where the layer 10 supported by the intermediate transfer member 1 has been bonded to the object 14 being formed, the wall 15, which has been built at the same time and by the same process as the object 14, surrounds the object 14 so as to seal the sides of the desired object 14 (being formed) at a predetermined distance. The top and bottom of the object 14 are sealed by the intermediate transfer member 1 and the stacking unit 8, respectively.

After this state is created, a support material for supporting the object 14 being formed is injected into the space between the object 14 being formed and the wall 15. The support material used in this embodiment may undergo a reversible phase transition between solid and liquid in response to external stimuli. For example, there are numerous compounds capable of melting or solidifying reversibly in response to thermal stimuli that heat or cool them beyond the melting point. Among such compounds, those that do not dissolve or mix with the building material may be used. For example, if the building material is a thermoplastic, materials such as paraffin wax and polyethylene glycol may be used. Low-melting-point metals can also be used. Other examples include electrorheological (ER) fluids, which exhibit changes in fluidity in response to electrical signals, magnetorheological fluids, which lose their fluidity in response to magnetic fields, and azobenzenes, which liquefy reversibly when irradiated with light and solidify reversibly when heated.

It should be undeerstood that, if the structural material is a thermoplastic resin and the support material undergoes a solid-liquid phase transition in response to heat, the support material must have a lower melting point than the structural material. In particular, polyethylene glycol is advantageous in that it allows melting point control depending on the molecular weight, is safe, and facilitates finish cleaning because of its solubility in water.

According to this embodiment, the support material is supplied in the form of a fluid. The support material can thus be simultaneously injected into a plurality of layers. For example, a cross-sectional pattern that does not include isolated portions, which are not continuous with the remaining portion and would therefore be suspended in air, may be stacked without injecting the support material. The support material may be simultaneously injected into a plurality of layers before a cross-sectional pattern that includes isolated portions is stacked. This improves productivity.

For example, the apparatus in FIG. 1 injects a support material stored in a support-material supplying unit 9 through inlets provided in the intermediate transfer member 1. The layer patterns of the object 14 to be formed, which are stored in the form of data in advance, must be formed so as not to interfere with the inlets provided in the intermediate transfer member 1.

The support material previously supplied to the object 14 being formed may or may not be melted in the step of injecting fresh support material. No problem occurs even if the support material present under the overhanging portions of the layer to he newly stacked is temporarily melted and liquefied, since the overhanging portions are supported on the surface of the intermediate transfer member 1.

Figure 7B:
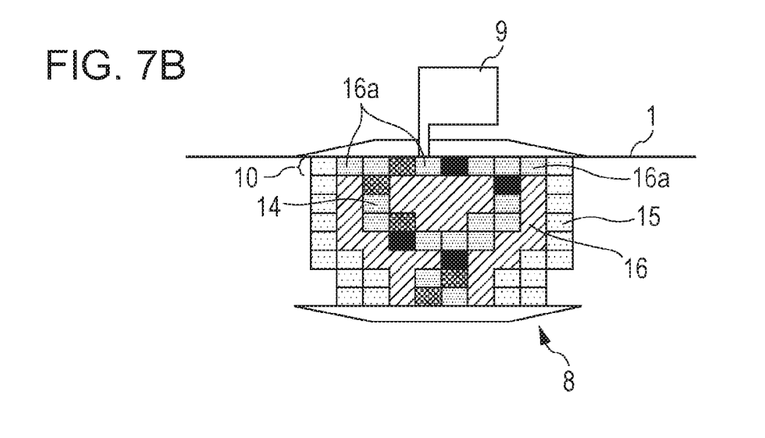
FIG. 7B is a schematic view showing part of the additive manufacturing process according to the first embodiment of the present invention.

After the injection of the support material is complete, the entire system is cooled, resulting in the state shown in FIG. 7B. The cooling unit may be disposed on the ceiling of the stacking unit 8 or on the back side of the intermediate transfer member 1.

Figure 7C:
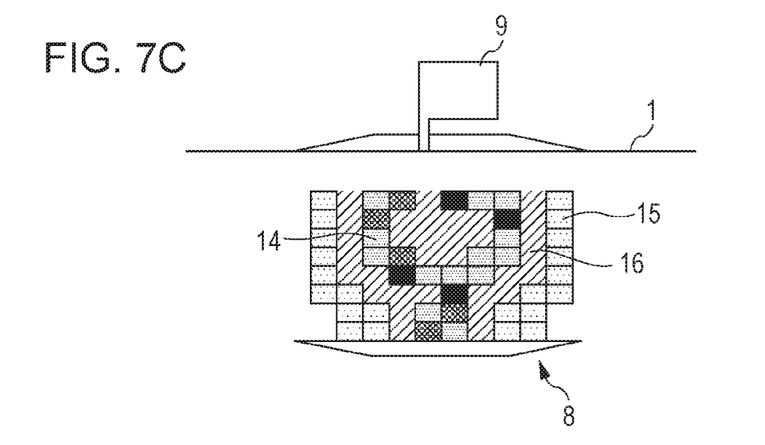
FIG. 7C is a schematic view showing part of the additive manufacturing process according to the first embodiment of the present invention.

In this embodiment, the stacking unit 8 is lowered to relatively separate the intermediate transfer member 1 from the stack of layers forming the object 14 being formed. In this way, the layer 10 transferred from the intermediate transfer member 1 is bonded to and integrated with the object 14 being formed, resulting in the state shown in FIG. 7C. After the support material 16 is solidified by cooling, the overhanging portions, which are supported on the surface of the intermediate transfer member 1 while the previously supplied support material 16 remains liquid, are supported by the support material 16. The intermediate transfer member 1 can be separated in this state.

In particular, if a support material capable of undergoing a solid-liquid phase transition is used, it may have insufficient retaining force, depending on the material. In this case, a sufficient retaining force can be achieved by reducing the space between the wall 15 and the desired object 14 so that they are closer to each other.

The series of steps from ink application to layer formation and to stacking are repeated for a predetermined number of cycles to stack layers, thereby building an object. After stacking is complete, the support material 16 can be removed, for example, by melting with heat, and the object can then be removed. Following optional post-treatments such as surface polishing and hardening, a three-dimensional object is completed. After the remaining wall 15 is removed, the next building process can be started.

Figure 5:
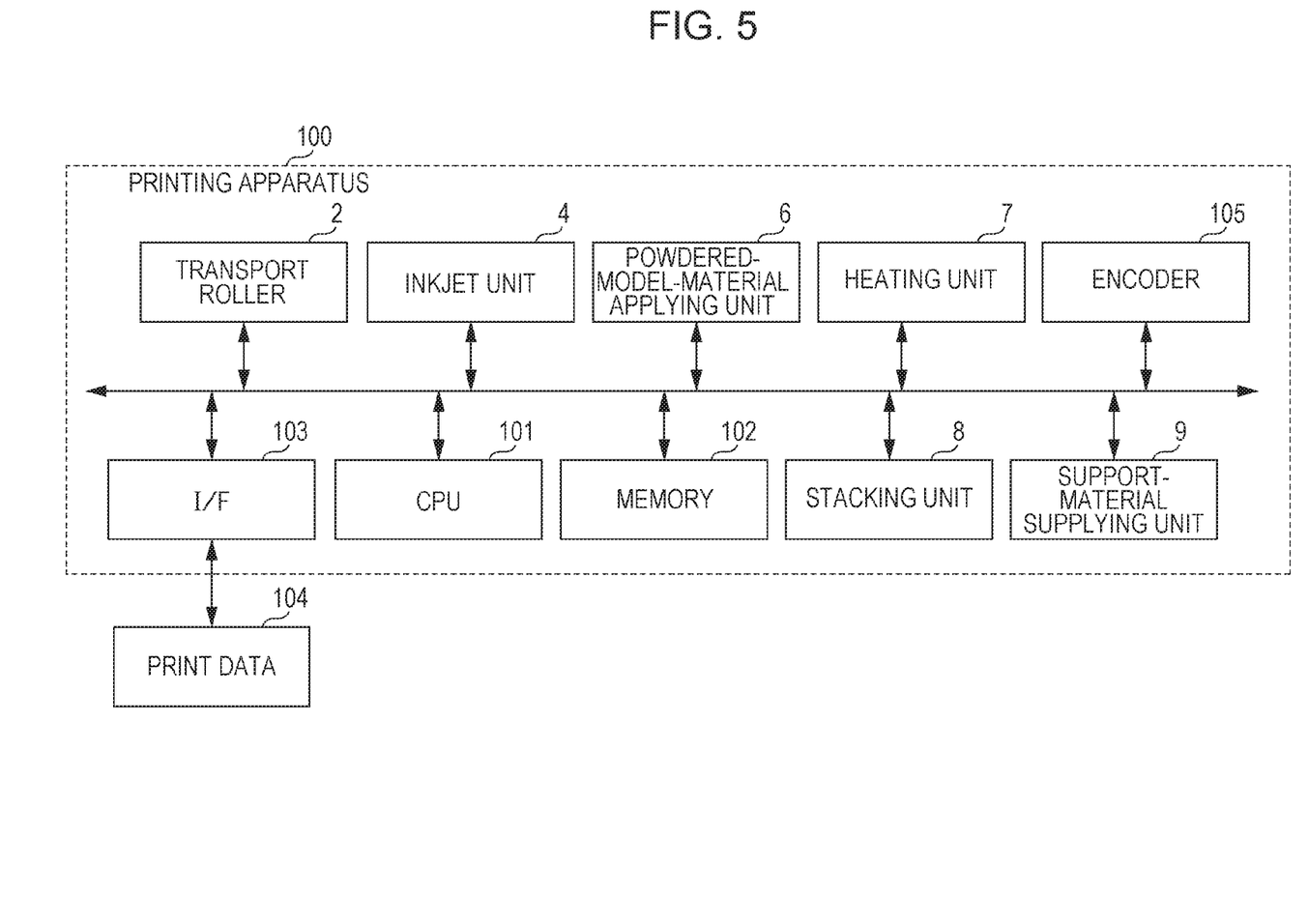
FIG. 5 is a block diagram of an example control system of the additive manufacturing apparatus according to the first embodiment of the present invention.

FIG. 5 shows an example control system of the printing apparatus in FIG. 1. The printing apparatus is generally indicated at 100. The printing apparatus 100 includes a CPU 101 that serves as a main control unit to control various units in the entire system and a memory 102 including a ROM that stores a basic program for the CPU 101 and a RAM that serves as a storage for print data 104 received via an interface 103 and as a working space for data processing.

Upon receiving a print start signal, the CPU 101 converts the print data 104 into slice data for actual patterning under preset conditions and calculates the position where the wall 15 is to be provided based on the slice data.

The CPU 101 sends the slice data and the data about the wall 15 to the inkjet unit 4 and, at the same time, executes communication for determining the statuses of the transport roller 2, the inkjet unit 4, the powdered-model-material applying unit 6, the heating unit 7, the stacking unit 8, and the support-material supplying unit 9. After it is determined that printing can be started, the transport roller 2 moves the intermediate transfer member 1. Once the intermediate transfer member 1 is positioned based on a signal from an encoder 105, the inkjet unit 4, the powdered-model-material applying unit 6, the heating unit 7, and the stacking unit 8 execute their respective operations. This process is repeated for a designated number of cycles to complete a three-dimensional object.

A wall 15 matching the shape of the desired object is formed layer by layer together with the object. The wall 15 is then sealed between the stacking unit 8 and the intermediate transfer member 1 to define an enclosed space around the object 14 being formed. This limits the amount of support material used.

The layers for forming the object are formed before the support material is supplied. This allows the support material to be provided without exact positioning of the support material and the object.

The support material can be selected from a wide variety of materials capable of undergoing a solid-liquid phase transition. This results in high material reusability.

Second Embodiment

Figure 2:
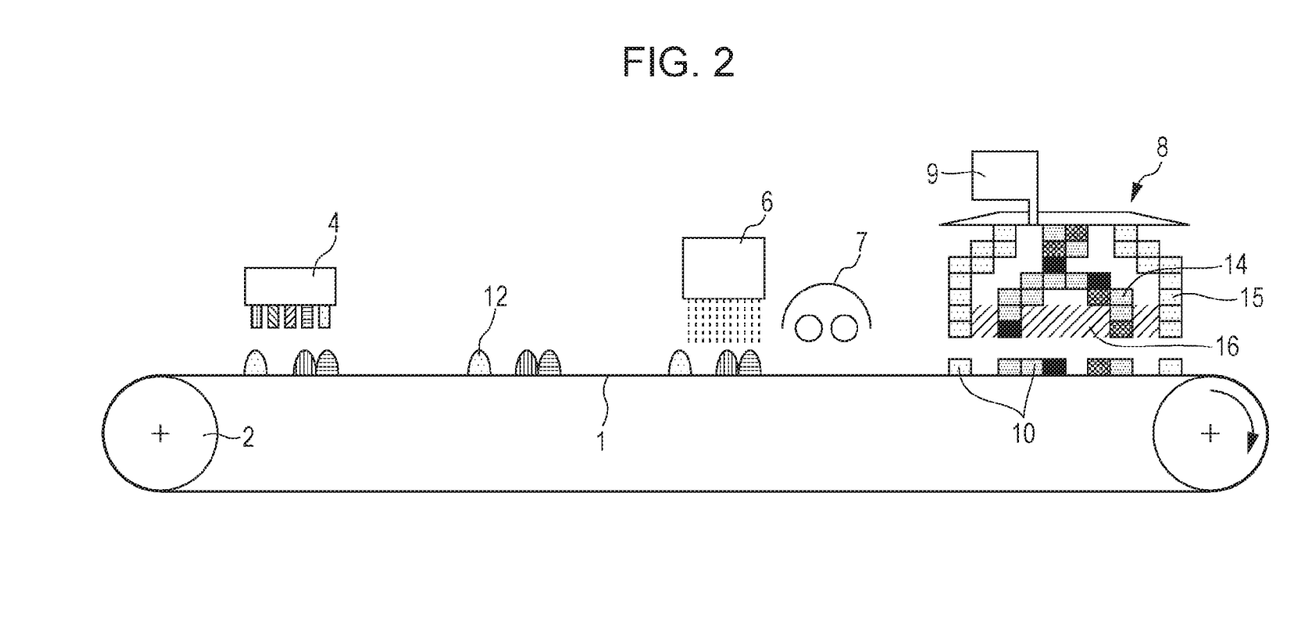
FIG. 2 is a schematic view showing an example additive manufacturing apparatus according to a second embodiment of the present invention.

A second embodiment of the present invention will now be described. FIG. 2 is a schematic view showing an additive manufacturing apparatus according to the second embodiment. A description of the same features as in the first embodiment is omitted herein.

In the apparatus according to the first embodiment, the layer-pattern forming section is disposed on the front side (e.g., the upper side) of the intermediate transfer member 1, and inverted layer patterns are stacked on the stacking unit 8 disposed on the back side (e.g., the lower side) of the intermediate transfer member 1. In the apparatus in FIG. 2, the inkjet unit 4 and the stacking unit 8 are disposed on the same side of the intermediate transfer member 1.

Figure 8A:
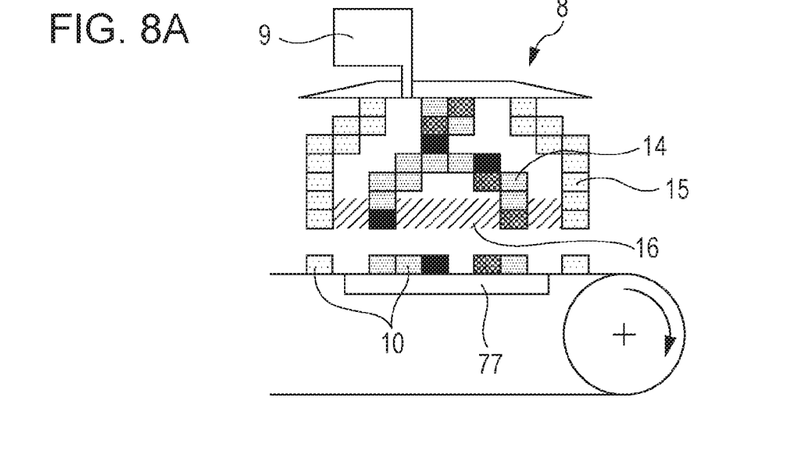
FIG. 8A is a schematic view showing part of an additive manufacturing process according to the second embodiment of the present invention.
Figure 8B:
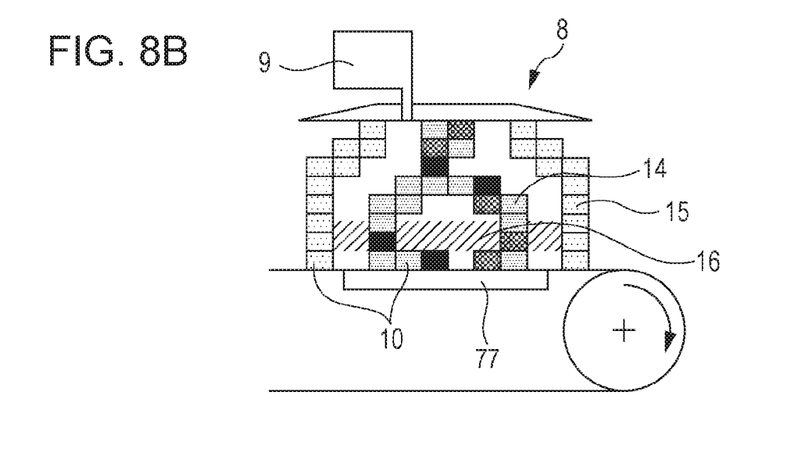
FIG. 8B is a schematic view showing part of the additive manufacturing process according to the second embodiment of the present invention.
Figure 8C:
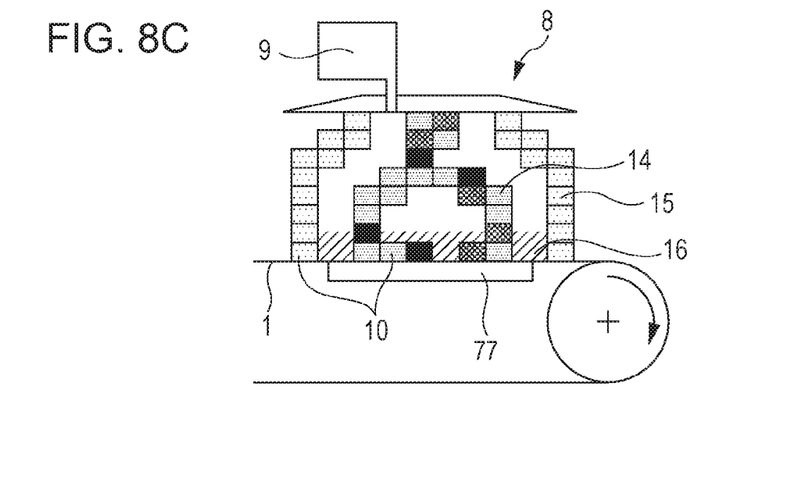
FIG. 8C is a schematic view showing part of the additive manufacturing process according to the second embodiment of the present invention.

The apparatus shown in FIG. 2 melts the previously supplied support material with a predetermined mechanism so that it flows into the lower layers. This allows overhang shapes to be formed without filling the inner space with the support material 16 and the object 14. FIGS. 8A to 8C are schematic sectional views of this process. FIG. 8A shows the stacking unit 8 and its vicinity in the state shown in FIG. 2. As shown in FIG. 8B, the object 14 being formed and the wall 15 supported by the support material 16 are bonded to the layer 10. As shown in FIG. 8C, the support material 16 is melted and fluidized so that it flows into contact with the intermediate transfer member 1. The support material 16 may be melted by heating with a temperature control unit 77 disposed on the stacking unit 8 or on the back side of the intermediate transfer member 1. The support material 16 is then cooled and solidified again by the temperature control unit 77. The surface of the support material 16 follows the surface of the intermediate transfer member 1 and is therefore flush with the surface of the newly stacked layer 10, forming a smooth surface together with the surface of the layer 10.

As shown, the heat required for melting or solidifying the support material 16 with the temperature control unit 77 flows across the thickness of the support material 16. In view of this, the support material 16 may have a constant thickness to facilitate management of the time for melting or solidifying the support material 16.

Figure 9A:
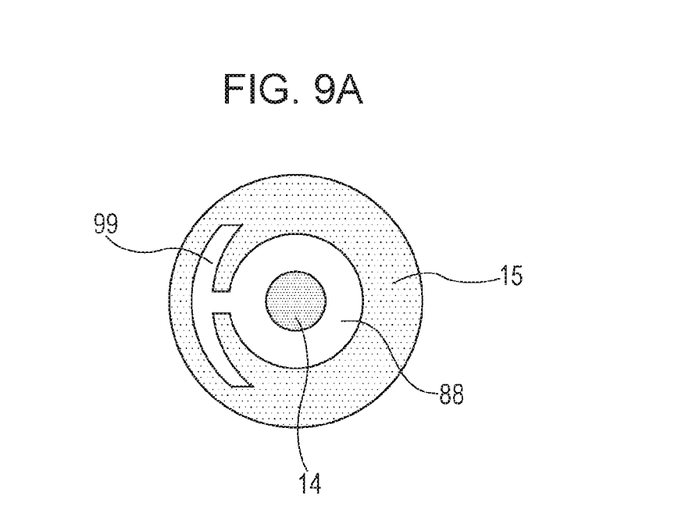
FIG. 9A is a schematic view showing part of the additive manufacturing process according to the second embodiment of the present invention..
Figure 9B:
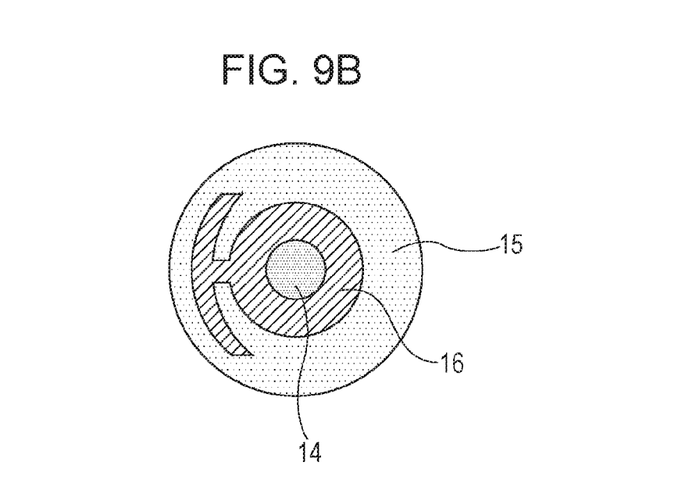
FIG. 9B is a schematic view showing part of the additive manufacturing process according to the second embodiment of the present invention.

In the state in FIG. 8C, the cross-sectional area (parallel to the intermediate transfer member 1) of the object 14 is smaller in the upper portion and is larger in the lower portion. FIG. 9A is a sectional view, similar to the cross-section in part (c1) of FIG. 4, of the wall 15 and the object 14 being formed at the position c in part (d) of FIG. 4. For example, an extra space 99 may be provided in the upper portion of the wall 15 in FIG. 8C. In this case, as shown in FIG. 9B, the support material 16 enters the extra space 99 in the upper portion of the wall 15. The extra space 99 is provided such that the cross-sectional area of the space 88 including the extra space 99 during the building of the upper portion of the object 14 is substantially the same as that of the space 88 between the wall 15 and the object 14 during the building of the lower portion. Thus, during the building of the lower portion, the support material 16 supplied to the upper portion flows into the lower portion and has substantially the same thickness as when supplied to the upper portion, despite the fact that the cross-sectional area of the object 14 is larger in the lower portion than in the upper portion, and accordingly, the cross-sectional area of the space 88 is larger in the lower portion than in the upper portion.

In this way, the support material 16 can be maintained at constant thickness during building while the distance between the object 14 being formed and the wall 15 is constant along the height of the object 14. This contributes to efficient manufacture.

Figure 6A:
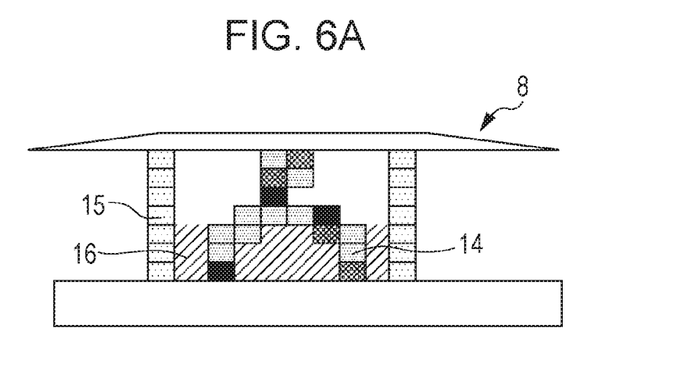
FIG. 6A is a sectional view showing the shapes of an object and a wall in a second embodiment of the present invention.
Figure 6B:
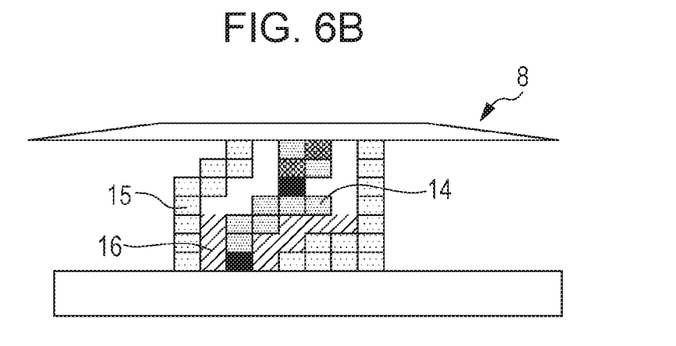
FIG. 6B is a sectional view showing the shapes of an object and a wall in the second embodiment of the present invention.
Figure 6C:
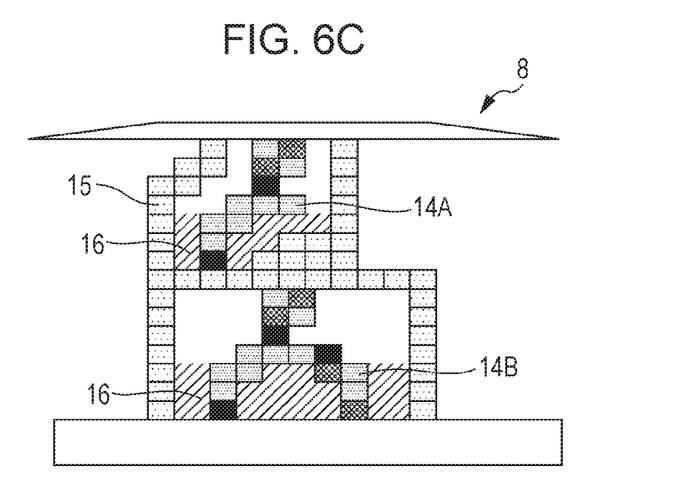
FIG. 6C is a sectional view showing the shapes of objects and a wall in the second embodiment of the present invention.

FIGS. 6A to 6C are schematic views of objects according to this embodiment during manufacture.

FIG. 6A shows an example in which the object 14 being formed is surrounded by a wall 15 extending in a straight line along the height. The support material 16 can he supplied only to the area corresponding to the size of the object 14 irrespective of the apparatus size (building area). FIG. 6B shows an example in which the wall 15 is shaped to follow the object 14 being formed. This example allows the support material 16 to be more efficiently used than in the example in FIG. 6A. FIG. 6C shows an example in which a plurality of objects are formed in the same batch using the wall 15. A floor is formed with the wall 15 under an upper object 14A, and the next object 14B is formed under the object 14A with the floor therebetween. This example allows objects of varying sizes and shapes to he reliably and efficiently formed.

Third Embodiment

Figure 3:
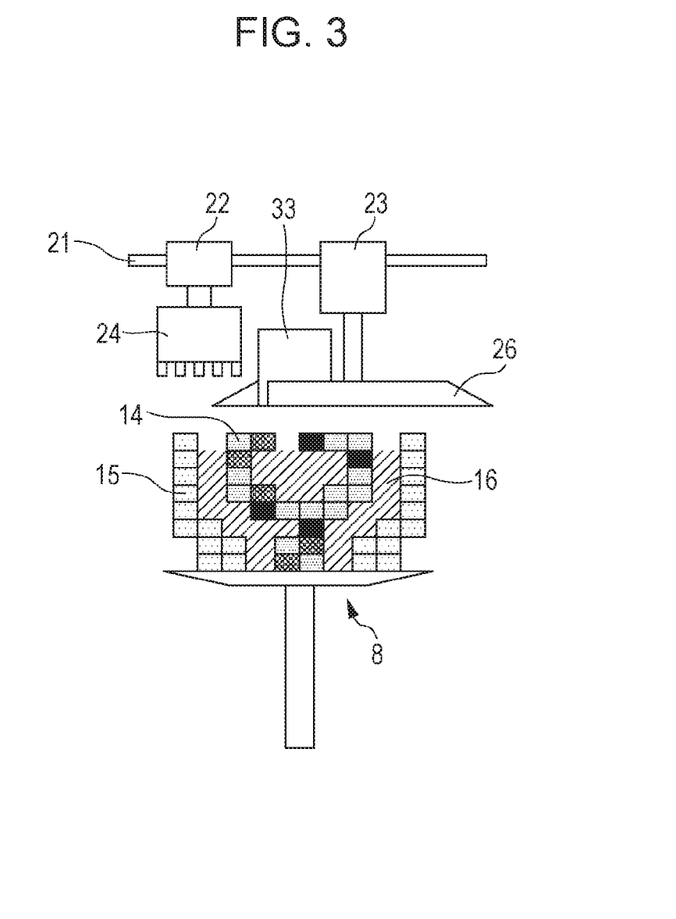
FIG. 3 is a schematic view showing part of an example additive manufacturing apparatus according to a third embodiment of the present invention.

A third embodiment of the present invention will now be described. FIG. 3 is a schematic view showing part of an additive manufacturing apparatus according to the third embodiment. In the first and second embodiments, layers are repeatedly stacked on the object being formed via the intermediate transfer member 1; in the third embodiment, as shown in FIG. 3, a building material such as a UV-curable resin is directly applied to the object 14 being formed to form an object-and-wall pattern on the object 14 being formed. The patterning unit illustrated in FIG. 3 is an inkjet unit 24. The inkjet unit 24 is lifted and lowered by an elevator mechanism 22 linked to a guide 21 and is moved horizontally along the guide 21 to a predetermined position relative to the stacking unit 8. At this position, the inkjet unit 24 ejects inks to form an ink pattern. After the object-and-wall pattern is formed, a limiting plate 26 is moved by an elevator mechanism 23 linked to the guide 21 to cover the top surfaces of the wall 15 and the object 14 being formed. A support-material supplying unit 33 then charges the support material 16 into the space defined by the wall 15, the object 14 being formed, and the limiting plate 26.

EXAMPLE

The present invention is further illustrated by the following example. This example illustrates an example additive manufacturing process using the alternative apparatus described with reference to FIG. 2.

Object data was converted into slice data at a predetermined layer pitch in advance. Layer patterns including wall patterns were then created by calculation. The slice data used in this example was created at a pitch of 100 μm, The intermediate transfer member 1 used herein was a 0.4 non thick PET film coated with a silicone rubber having a rubber hardness of 40° (KE-1310, Shin-Etsu Chemical Co., Ltd.) to a thickness of 0.2 mm. To prevent the intermediate transfer member 1 from repelling ink, the surface thereof was modified with a remote atmospheric-pressure plasma treatment system (APT-203 (modified), Sekisui Chemical Co., Ltd.) under the following conditions.

Surface Modification Conditions

Types and flow rates of gases: air, 1,000 cc/min; $N_2$, 6,000 cc/min

Input voltage: 230 V

Frequency: 10 kHz

Processing rate: 100 mm/min

The following color inks were then ejected from the inkjet unit 4 to form an ink pattern 12 including an object cross-section and a wall cross-section on the intermediate transfer member 1.

Ink Composition

The following pigments: 3 parts by mass

Black: carbon black (MCF88, Mitsubishi Chemical Corporation) Cyan: Pigment

Blue 15; magenta: Pigment Red 7; yellow: Pigment Yellow 74

Styrene-acrylic acid-ethyl acrylate copolymer (acid value: 240, weight average molecular weight: 5,000): 1 part by mass Glycerol: 10 parts by mass Ethylene glycol: 5 parts by mass Surfactant (Acetylenol EH, Kawaken Fine Chemicals Co., Ltd.): 1 part by mass Pure water: 80 parts by mass Polypropylene particles (average particle size: 200 μm) were then applied as a powdered model material to the ink pattern 12 on the intermediate transfer member 1 using a blade coater.

A flow of uncharged air was then directed from an air knife onto the intermediate transfer member 1 to remove the polypropylene particles deposited outside the ink pattern 12.

The powdered model material was then melted by heating at about 170° C. with the heating unit 7 to form a film.

The molten film, i.e., the layer 10, was then transported to the stacking unit 8. After positioning, the stacking unit 8 was lowered to a position where the distance between the stacking unit 8 and the surface of the intermediate transfer member 1 was 100 µm to bring the layer 10 into contact with the surface of the stacking unit 8.

A support material (commercially available PEG 2,000) was then melted at about 70° C. and was charged into the space defined by the wall portion of the layer 10, the stacking unit 8, and the intermediate transfer member 1.

Cold water was then circulated through a cooling mechanism (not shown) on the back surface of the intermediate transfer member 1 to cool and solidify the building material and the support material.

As the stacking unit 8 was lifted, the layer of the building material and the support material 16 was transferred from the intermediate transfer member 1 to the stacking unit 8. Thus, the first layer was completed.

This process was repeated for 50 cycles to form an object having a height (thickness) of 5 mm. Stacking was continued without charging extra support material.

When layers were melted and stacked without charging extra support material 16, the support material 16 melted and fell onto the surface of the intermediate transfer member 1 and followed the surface of the intermediate transfer member 1. The support material 16 was then solidified by cooling. After transfer, the object 14 being formed and the support material 16 formed a smooth surface on the surface layer of the object 14 being formed.

The above layer-forming and stacking operations were repeated for a total of 1,000 cycles to form an object having a height of 10 cm.

After the final layer was stacked, the molten support material 16 was automatically removed by suction into the support-material supplying unit 9 before the stacking unit 8 was lifted.

The object was removed from the stacking unit 8. Thus, the desired three-dimensional object was obtained.

The present invention provides a method and apparatus for manufacturing a three-dimensional object with a reduced amount of material and without the need for precise positioning of an object and a support during the formation of the support.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-149483, filed Jul. 23, 2014, which is hereby incorporated by reference herein in its entirety.

The invention claimed is:

1. A method for manufacturing a three-dimensional object, comprising the steps performed in this order, of:
   providing a layer including a portion for forming first object and a portion for forming a wall surrounding the first object being formed on an intermediate transfer member;
   transferring the portion for forming the first object on the intermediate transfer member to the first object being formed and transferring the portion for forming the wall on the intermediate transfer member to a wall surrounding the first object being formed on a stacking unit, thereby a plurality of layers for forming the first object are stacked and the wall surrounding the first object being formed at a distance from the first object being formed is built on the stacking unit;
   injecting a fluid material which transitions back-and-forth between a solid state and a liquid state in response to an external stimulus into a space between the wall and the first object being formed on the stacking unit as a support material for supporting the first object;
   forming a floor with the wall on a side, opposite to the stacking unit, of the first object, and a next object on a side far from the stacking unit than the first object with the floor between the next object and the first object and with a next wall surrounding the next object;
   removing the support material from the formed object; and
   obtaining the formed object separated from the wall.

2. The method for manufacturing a three-dimensional object according to claim 1, wherein the wall is built by forming a layer for forming the wall and placing the layer for forming the wall around a layer for forming the first object.

3. The method for manufacturing a three-dimensional object according to claim 1, comprising:
   forming a layer comprising a portion for forming the first object and a portion for forming the wall; and
   stacking the portion for forming the first object and the portion for forming the wall on the first object being formed and the wall surrounding the first object being formed.

4. The method for manufacturing a three-dimensional object according to claim 1, wherein the wall surrounding the first object being formed is shaped depending on the shape of the first object being formed corresponding to the wall at each different position in a stacking direction in which the plurality of layers are stacked.

5. The method for manufacturing a three-dimensional object according to claim 3, wherein the layer comprising the portion for forming the first object and the portion for forming the wall is formed such that the portion for forming the wall in each layer is shaped depending on the portion for forming the first object.

6. The method for manufacturing a three-dimensional object according to claim 3, wherein the layer comprising the portion for forming the first object and the portion for forming the wall is formed such that the portion for forming the first object and the portion for forming the wall are separated from each other at a predetermined distance.

7. The method for manufacturing a three-dimensional object according to claim 1, wherein the wall is provided so as to seal a side of the first object being formed.

8. The method for manufacturing a three-dimensional object according to claim 4, further comprising:
   after the support material is formed, fluidizing the support material and allowing the fluid support material to move toward a layer that is to be newly stacked,
   wherein the wall is shaped depending on the shape of the first object being formed corresponding to the wall at each different position in the stacking direction in which the plurality of layers are stacked such that the support material has a constant thickness.

9. The method for manufacturing a three-dimensional object according to claim 1, further comprising:
   removing the wall from the stacking unit.

10. The method for manufacturing a three-dimensional object according to claim 1, wherein the next wall and the next object are separated by a next support member supporting the next object.

\* \* \* \* \*